United States Patent
Walles

(10) Patent No.: US 6,940,829 B2
(45) Date of Patent: Sep. 6, 2005

(54) METHOD AND PROCESSOR IN A TELECOMMUNICATION SYSTEM

(75) Inventor: Erik Walles, Taby (SE)

(73) Assignee: Telefonatiebolaget LM Ericsson (publ), Stockholm (SE)

( * ) Notice: Subject to any disclaimer, the term of this patent is extended or adjusted under 35 U.S.C. 154(b) by 819 days.

(21) Appl. No.: 09/759,645

(22) Filed: Jan. 16, 2001

(65) Prior Publication Data

US 2002/0077809 A1 Jun. 20, 2002

(30) Foreign Application Priority Data

Jan. 13, 2000 (EP) .......................................... 00850002

(51) Int. Cl.$^7$ .................................................. H04B 3/20
(52) U.S. Cl. ................... 370/286; 370/289; 379/406.06
(58) Field of Search ................. 370/286, 352, 370/353, 354, 287–292, 276, 208, 341, 345; 379/406.01, 406.02, 406.03, 406.05, 406.06, 406.08, 409.07, 406.07, 406.13; 375/346, 350; 704/201, 210, 211, 120; 718/105, 107; 708/322

(56) References Cited

U.S. PATENT DOCUMENTS

| | | | | |
|---|---|---|---|---|
| 4,777,633 A | * | 10/1988 | Fletcher et al. | 370/345 |
| 5,121,391 A | * | 6/1992 | Paneth et al. | 370/341 |
| 5,414,766 A | * | 5/1995 | Cannalire et al. | 379/406.08 |
| 5,559,793 A | * | 9/1996 | Maitra et al. | 370/286 |
| 5,590,121 A | * | 12/1996 | Geigel et al. | 370/290 |
| 5,619,566 A | * | 4/1997 | Fogel | 379/406.07 |
| 5,628,013 A | | 5/1997 | Anderson et al. | |
| 5,631,900 A | * | 5/1997 | McCaslin et al. | 370/287 |
| 5,655,120 A | | 8/1997 | Witte et al. | |
| 5,668,794 A | * | 9/1997 | McCaslin et al. | 379/406.07 |
| 5,835,486 A | * | 11/1998 | Davis et al. | 370/287 |
| 6,078,566 A | * | 6/2000 | Kikinis | 370/286 |
| 6,078,567 A | * | 6/2000 | Traill et al. | 370/289 |
| 6,167,133 A | * | 12/2000 | Caceres et al. | 379/406.13 |
| 6,178,162 B1 | * | 1/2001 | Dal Farra et al. | 370/286 |
| 6,625,126 B1 | * | 9/2003 | Kikinis | 370/286 |
| 6,654,463 B1 | * | 11/2003 | Leonidov et al. | 379/406.08 |
| 6,724,736 B1 | * | 4/2004 | Azriel | 370/286 |
| 6,782,358 B2 | * | 8/2004 | Cox et al. | 704/210 |
| 2003/0040903 A1 | * | 2/2003 | Gerson | 704/211 |
| 2003/0174661 A1 | * | 9/2003 | Lee | 370/286 |

FOREIGN PATENT DOCUMENTS

| | | |
|---|---|---|
| EP | 0 690 603 A2 | 1/1996 |
| WO | 99/31866 | 6/1999 |

* cited by examiner

Primary Examiner—Phirin Sam
(74) Attorney, Agent, or Firm—Nixon & Vanderhye, P.C.

(57) ABSTRACT

In a method of running a processor for high performance operation in a communication network one function of the processor is a calculation using an algorithm. The function can include calculation for each of a plurality channels. In situations, when there is not available processor capacity to perform the calculation function for each channel, the quality of the algorithm is degraded in a controlled manner to decrease the amount of necessary calculations so that more channels can be handled. The quality of the algorithm is degraded by dividing the algorithm into subfunctions and by performing only some of the subfunctions in said situations when momentary calculation peak exist.

61 Claims, 3 Drawing Sheets

METHOD AND PROCESSOR IN A TELECOMMUNICATION SYSTEM

The present invention is concerned with a method in a telecommunication network for processing information such as running a processor for high performance operation in packet switched networks, but can also be used in circuit-switched networks, and is also concerned with a processor handling information in a telecommunication network.

BACKGROUND

Information can be sent through networks in different ways. Packet switching is a method for sending information in a network in which nodes of the network share bandwidth with each other, the information being sent in small pieces in packets which include address information in addition to the information, each packet being individually routed through the network. Circuit switching is a method for sending information in a network in which a dedicated physical circuit path or channel is established between a sender and a receiver and is used for sending all of the information. The information can then be sent e.g. in dedicated slots included in successive frames.

Packet switching is more efficient for communicating information than circuit switching, in view of using the resources. On the average, a large number of connections can be supported over a given physical channel in a packet switched network. This transport efficiency can be enhanced by dividing the traffic into different priority classes. Then information having a high priority is sent before information, having a low priority. Furthermore, information is only sent through a packet switched network when there is some information to convey, whereas in a circuit switched network a channel is established for each connection and this channel remains until the connection is ended. For example for information transmitted in periodically repeated frames, a dedicated slot of all frames is always reserved for the connection. This means that, statistically, in a given traffic situations a packet switched network can support more connections. In a packed switched network for example ATM (Asynchronous Transfer Mode) and IP (Internet Protocol) can be used.

For a better use of the resources, some statistical aspects are currently applied to the resources or devices, which handle the traffic in circuit switched networks. Pooling of devices or resources is a method used in circuit-switched STM (Synchronous Transfer Mode) nodes of today. For example, speech coders in GSM (Global System of Mobile Communication) are not semi-permanently connected to transmission trunks, but rather allocated from a pool on a per call basis. Thus, a smaller number of coders can support a given number of trunks.

Some resources, e.g. echo cancellers or transcoders, use given amounts of calculations performed on media streams in the processing when performing the functions e.g. to achieve a better speech quality or a lower bit rates respectively. Other such resources are, for example, error coding permitting correction of transmission errors, channel coding, and interleaving as performed in radio base stations.

Speech quality has become an important factor in modern telephony. A number of connections have an inherent transmission delay that makes echo control necessary. Echo cancelling, which is a modern way of handling the echo problem is used extensively both in long distance terrestrial or satellite networks and in digital-cellular to public switched telephone network circuits (PSTNs). The design of the echo cancellers plays a vital role in the overall speech quality of telephony systems.

The article Anders Eriksson, Gunnar Eriksson, Johnny Karlsen, Anders Roxström and Teresa Vallon Hulth, "Ericsson echo cancellers—a key to improved speech quality", Ericsson Market Communications, Ericsson Radio Systems AB, Sweden, 1996, which is incorporated by reference herein, contains a description of methods used in echo cancellers of today, which are shortly reviewed in the following.

Echoing in telephony takes place when speech is reflected back to the speaker as a distorted and delayed replica. The reflected speech energy is not a problem if the transmission path is short, but will appear as an echo with an increased delay according to the length of the transmission path. Another cause of echoing is acoustic cross talk between the loudspeaker and the microphone in a handset or in a loud-speaking telephone set.

Large delays are e.g. caused by the use of satellites for intercontinental calls. In digital cellular systems delays are caused by the speech and channel coding and decoding necessary used for transforming speech signals to the digital signal format used for radio transmission and for retrieving the speech signals from received digital signals.

The phenomenon of echoing can be handled by employing echo cancellers. In digital cellular applications, these devices are located in mobile switching centers, MSCs, and in long distance telephony circuits, they are usually located in international switching centers, ISCs.

The principle of an echo canceller 100 is illustrated by the block diagram of FIG. 1. A replica of the echo existing in a signal $R_{in}$ or $R_{out}$ is obtained via a linear filter 102 and subtracted from the input signal $S_{in}$ resulting in a signal $S_b$. In this signal there may be a residual echo signal, that, is further suppressed by a non-linear processor 104. Comfort noise is added as produced in comfort noise generator 106. By noise estimation, the noise existing in a call is estimated and seat during a call in non-talking situations, so that it would not be completely quiet during those moments. A hybrid circuit 108 converts a 4-wire connection to/from a 2-wire connection.

The linear filter 102 makes a replica, or estimate, using characteristics of the path producing the echo. Passing the input signal $S_{in}$ through the filter generates an estimated echo signal that is subtracted from the input signal $S_{in}$ to reduce the echo. A calculation algorithm performs the echo cancellation performed in the filter 102, so that after a given time it can evaluate the echo in a forward direction and send out the same echo so that the echo in the received signal can be suppressed. For this purpose, the echo canceller adapts the filter coefficients of the linear filter to the current echo path. Most state of the art echo cancellers use an adaptive filter with continuous updating the filter coefficients. The most widely used algorithm for adjusting the filter coefficients is the normalised least mean squares method, NLMS.

In many situations the echo reduction obtained by the linear filter is not sufficient. The output from the linear filtering part 102 is therefore passed to a non-linear processor. NLP 104, which further reduces the echo by blocking the residual echo signal, completely or partially, when it is dominated by a non-cancelled residual echo.

The linear filter 102 and the non-linear processor 104 are the two basic blocks in most echo cancellers. For good echo canceller performance of an echo canceller to be achieved, the operation of these two blocks must be governed by control circuits 110. The control circuits allow the linear filter 102 to produce a good estimate of the echo path. The control circuits are as to the non-linear processor 104 responsible for detecting the presence of a large or small amount of non-cancelled echo to be suppressed by the non-linear processor.

The design of the control logical circuits 110 for the adaptive filter 102 and the non-linear processor 104 has a large impact on the overall performance of an echo canceller. The most important part of the control circuits of an echo canceller is the part that secures a good echo attenuation throughout the call. The two parties of a telephone call are normally talking only one at a time, which means that times for updating the filter can easily found in order to have a good echo path estimate. Nevertheless, there are also situations when the parties are talking at the same time, referred to as double-talk situations. The adaptation of the filter 102 should then be inhibited, since otherwise an erroneous estimate of the echo path is obtained. These two cases can be discriminated by using a double-talk detector, which is a state machine based on comparisons of the power of the measurable signals.

Another part of the control logical circuits is the part, which controls the time when to activate the non-linear processor 104.

Thus, all the functions in an echo canceller, i.e. the functions of the non-linear processor 104, of the double talk detector etc., are not performed all the time, and thus different amounts of calculations are performed at different times. When a relatively large number of resources, such as echo cancellers, transcoders, channel coders etc. are used, it is very unlikely that all resources would need to make their maximum amounts of calculations at the same time. Still, there will be times when the total number of calculations attains an unsustainable level, for example in situations with a high traffic load. When this occurs, there is for the time being no other available solution in packet-switched networks than to drop one or several packets.

In general, over-dimensioning is not used if the calculation capacity is not used. The number of tasks per processor is evaluated by static means, i.e. the processor is always dimensioned for the worst load situation, which results in a poor average utilisation of the capacity of the processor.

If over-dimensioning is used, a common technique in packet-switched networks is to simply drop data packets during situations with a momentary high load, e.g. the technique used in IP routers of today.

In the published European patent application 0690603 a method for allocating resources in a call processing system is disclosed. The method includes allocating, for a new call, a level of resources depending on the available headroom in the system. The method allows using a less robust algorithm for the new call when the system load is heavy. One algorithm for each resource, or function, to be executed in the system is prioritised.

In U.S Pat. No. 5,628,013 a method is disclosed for determining whether there is enough processing time available within each frame to process the task such that the total processing time of the frame is not exceeded. This is done by first determining the processing time. A task is one or more processing modules. The processing time is calculated by adding the times for processing modules for a worst-case situation. A task-list includes the tasks which have already been installed and that will be executed within the frame. The various tasks are not related to each other.

SUMMARY

The object of the invention is to provide a method, which makes a better use of the total capacities of processors in a telecommunication network so that more tasks per processor can be handled.

Another object of the invention is to provide a method for handling more tasks per processor by taking advantage of statistical properties of traffic situations.

The method to be described herein is concerned with running a processor for high performance operation in communication networks. In the method, a function of a processor is performed by means of an algorithm performing a calculation function for each channel connected for communication. In situations, when there is not available capacity to perform the calculation functions for each channel, the quality of the algorithm is degraded in a controlled manner to decrease the amount of necessary calculations so that more channels can be handled.

Such situations might occur at momentary calculation peaks. The communication network considered herein is primarily a packet-switched network but can also be a circuit-switched network. The quality of the algorithm function is degraded in a controlled manner by e.g. dividing it into sub-functions having different priorities, so that functions with a higher priority are performed in front of functions having a lower priority.

The function of one resource, e.g. an echo canceller or a transcoder, can be divided into sub-functions having different priority levels. In situations with a high traffic load, only sub-functions having high priorities are then be executed for each channel, which provides for a minimum amount of functionality per channel. When using the method for example speech quality will be affected but the consequences will not be as severe as in those cases where data packets are dropped.

As stated above, the goal is to support a larger number of functions per processing unit compared to current implementations in circuit-switched STM nodes and compared to prior art solutions in packet-switched networks. Using the proposed method times may occur, which can be assumed to seldom happen, and even very seldom, when the quality of the service is somewhat degraded.

For example an echo cancellation function or algorithm can be divided into one or more of the following sub-functions: 1) filtering, 2) filter updating, 3) double-talk detection, 4) non-linear processing, 5) noise estimation, and 6) network probing.

Furthermore, the calculation algorithm can be divided into sub-functions. It can perform another function than echo cancellation such as a transcoder function, a tone detection function, a speech recognition function, a conference call device function, a modem function, a radio base station channel coding function or an interleaving function.
In Echo Cancellation
  the filtering sub-function makes a replica, or estimate, of the echo path, that is subtracted from the received signal in order to cancel or at least reduce the echo,
  the filter updating sub-function estimates filter coefficients, which depend on certain quality measures, and update them continuously, on an average 50% of the time. The updating is performed by means of a algorithm, e.g. the least mean squares, LMS, algorithm, for adjusting the filter coefficients,
  the double-talk detection sub-function is used to detect a situation, wherein both parties in a call are speaking. The filter updating sub-function is not used in these cases, since otherwise an erroneous estimate is achieved, the non-linear processing sub-function further reduces the echo after filtering by blocking the residual echo signal completely or partially, when it is dominated by a non-cancelled, residual echo. Instead of completely blocking, which could be perceived as a loss of the call, a small noise is sent/inserted, the noise estimation sub-function estimates the existing noise in a call and sends it during a call so that it would not be completely quiet during those moments, and the network probing sub-function is performed on an operator level. It can for example be used to describe the properties of the network used for an operator, e.g. how good/poor the hybrid circuits are, how much noise there is in the network etc., which information is used by the operator to design the networks.

Out of these functions, only the filtering has to be made in order to sustain a service that still could be referred to as echo cancellation. There are various consequences of not performing the other sub-functions. For example, if the non-linear processor is turned off, there might be a small echo in the signal sent from the echo canceller. In most cases, this will not cause a too severe degradation of the quality. Even in normal operation, the non-linear processor is switched off from time to time.

The best use of the proposed method is in systems, wherein a large number of echo cancellation functions are simultaneously performed for a large amount of channels run into the same digital signal processor (DSP) core. It can be an enhanced central processing unit, CPU. The method can as well be used in systems in which the calculations to be performed per time unit in the echo cancellation function vary, i.e. the average need of calculations is lower than the maximum ditto. These systems, i.e. high capacity DSPs, CPU/DSPs running at a high clock frequency, compared to a 100–200–500 MHz PC, provide for a better possibility to make use of statistical aspects than systems having a low number of echo cancellation functions, since such systems require a more constant amount of calculations.

Digital signal processors, which can support a large number of channels, are available,. Examples are the 1 GHz quadruple MAC DSP form Texas Instruments called Galileo, and the 350 MHz Star Core from Motorola and Lucent.

The actual number of channels per DSP is a trade-off between speech quality and the number of channels.

The method gives a possibility to base the number of channels handled by a digital signal processor on the average need of calculations and not on the maximum as is the common method in prior art solutions.

The method is thus especially applicable to high performance central processing units, e.g. digital signal processors, operating in packet switched nodes and systems.

The method can e.g. be implemented in software, and then the method is peformed when a computer program product is run.

In the following, the method will be described in detail by means of an example applied to an echo cancellation algorithm, which is not intended to restrict the invention in any way. The invention can equally well be applied to other recourses.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented below with reference to the accompanying drawings in which:

DETAILED DESCRIPTION

Figure 3:
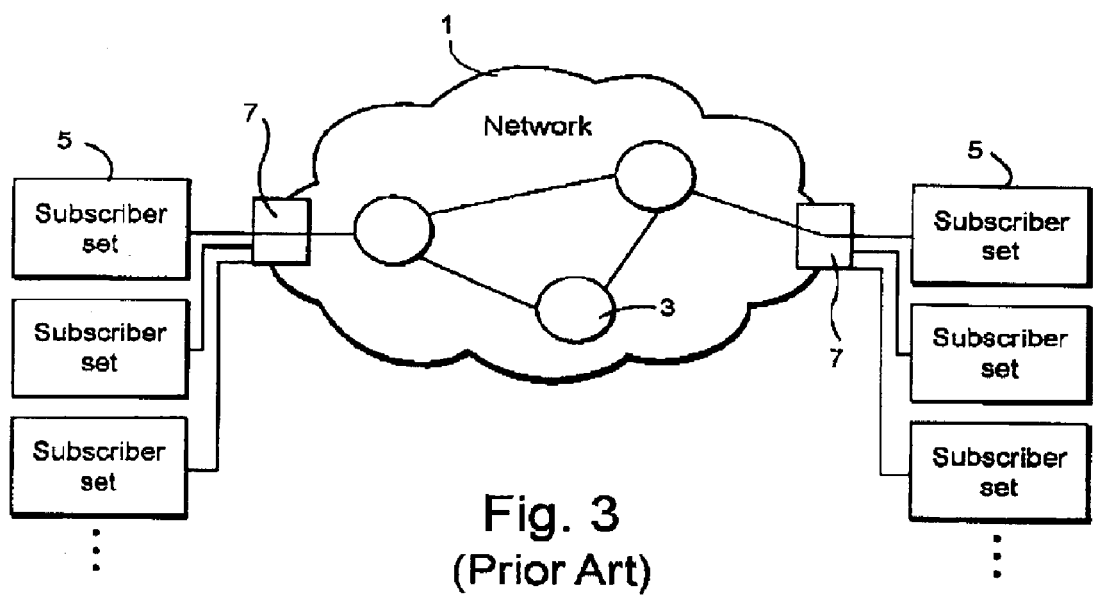
FIG. 3 is a schematic diagram of a telecommunication network.
Figure 4:
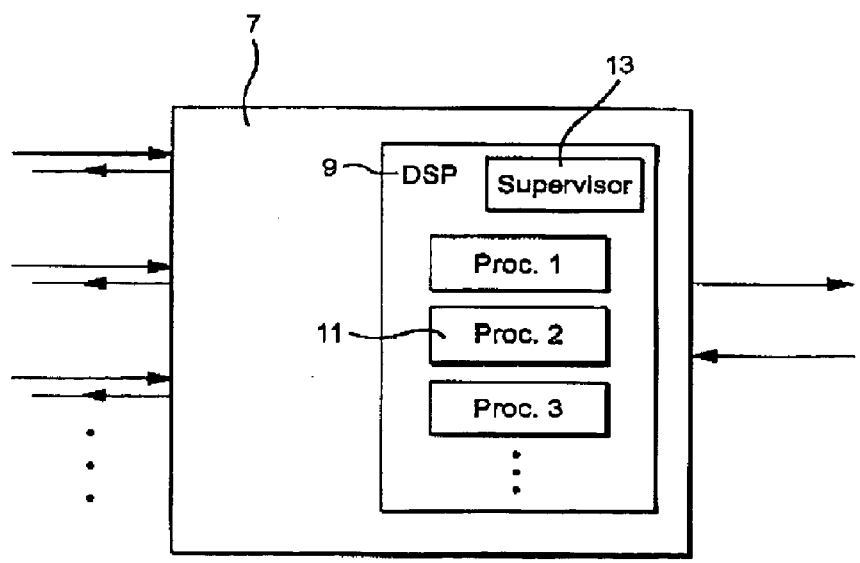
FIG. 4 is a general block diagram of a node in a network performing a multitude of functions involving calculations.

In a network 1 for communicating information switching nodes 3 are provided, see the schematic picture of FIG. 3. Subscriber sets 5 are connected to the network, e.g. through special network interface nodes 7, or directly to the switching nodes 3. A plurality of subscriber sets can be connected to the same node 7 or 3, the information in the node then passing in channels or connections established for the respective subscriber set. In e.g. the interface nodes 7 digital processing of signals received from the subscriber set and from the network is made in a digital signal processor 9, see the block diagram of FIG. 4. The digital signal processor is to arranged to perform a plurality of procedures 11 processing the signals in different ways, the monitoring of the procedures being managed by a control or managing program 13. The processing made in these procedures can involve rather time-consuming calculations and can have different influences on the generated signals, so that the processing in some of the procedures is more important for communicating the information and in some other ones the processing is less important. The DSP generally has to perform all of the procedures for information of a number connections or channels handled by the DSP.

Figure 1:
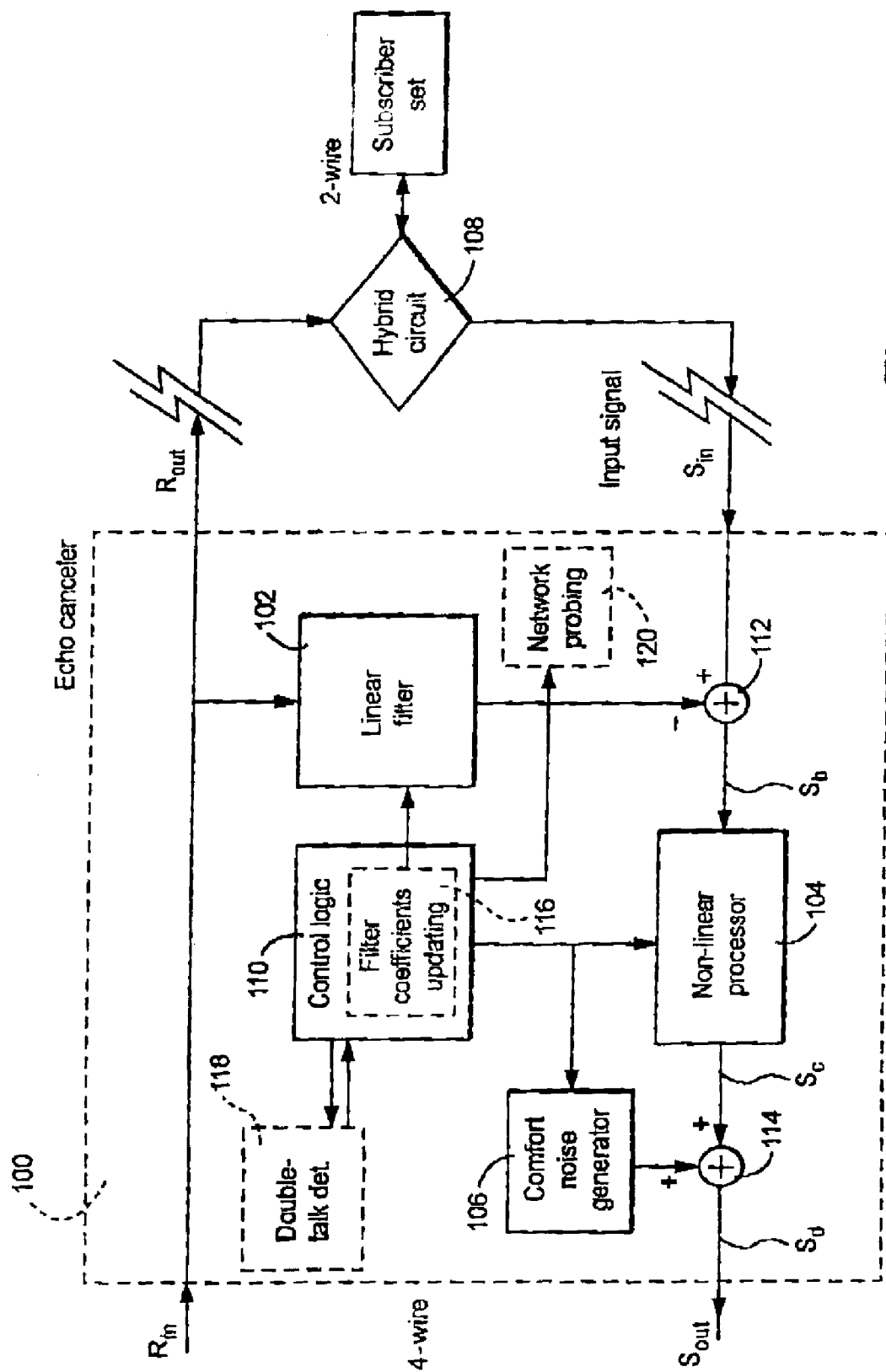
FIG. 1 is a block diagram illustrating the principle of an echo canceller according to prior art.

In particular the DSP 9 can make calculations according to an algorithm performing the different functions or procedures or an echo canceller 100 for voice or speech transmission, see the block diagram of FIG. 1. The echo canceller 100 is connected in the four-wire side of hybrid circuit 108 connected to e.g. a subscriber set through a two-wire line. The echo canceller receives a signal $S_{in}$ at the four-wire line from the subscriber and a signal $R_{in}$ from the network. The canceller transmits a signal at the four-wire line to the subscriber and a signal Sout to the network. In the signal $R_{out}$ from the network an echo signal may be present and a replica of the echo is obtained in a linear filter 102 and is subtracted in a summing node 112 from the signal $S_{in}$ input from the subscriber resulting in a signal $S_b$. In the obtained signal $S_b$ a residual echo signal may be present which is further suppressed in a non-linear processor 104 generating a signal $S_e$. Comformation is generated in a noise estimator and generator unit 106 and is added in a summing node 104 to the signal output from the non-linear processor 104 resulting in a signal $S_d$ which is the signal $S_{out}$ output from the echo canceller. The functional blocks 102, 104 and 106 are controlled by a logical control block 110. In each of the functional blocks calculations are made using one or more algorithms. All the functional blocks 102, 104 and 106 of the echo canceller 100 can be executed in separate procedures run by a single processor unit such as a digital signal processor. The control block 110 can include a subblock 116 for adapting filter coefficients of the linear filter. Furthermore, the echo canceller can comprise blocks 118, 120 for double-talk detection and network probing respectively.

It is obvious that e.g. the functions of the blocks 102, 104 and 106 have different importance for or impact on the quality of the transferred voice information. Thus, the function performed by the linear filter block 102 must always be executed to obtain an acceptable speech quality. The processing made in the non-linear processor block 104 is less important and the processing made in the comfort noise generator block 106 can have a still less importance.

In many types of nodes or interfaces in a telecommunication network the DSP 9 serves a large number of channels simultaneously. Then situations may occur in which the amount of calculations is too large and the DSP then cannot execute all the procedures required for the processing in the channels. Then information can be lost. However, instead some of the procedures 11 can then be temporarily skipped, this resulting in a less severe loss of information or a less severe reduction of the quality of the transmission through the node or interface. This can e.g. in the echo canceller 100 of FIG. 1 be achieved by modifying the control circuits 110 accordingly. As an alternative, only the most important procedures are performed for channels having a low priority whereas all procedures are performed for channels having a high priority.

Generally, the procedures for signal processing can be considered to be an algorithm divided into different parts, called subfunctions herein, in such a way that the algorithm can be performed either by performing all the subfunctions or only a part of them.

Figure 2:
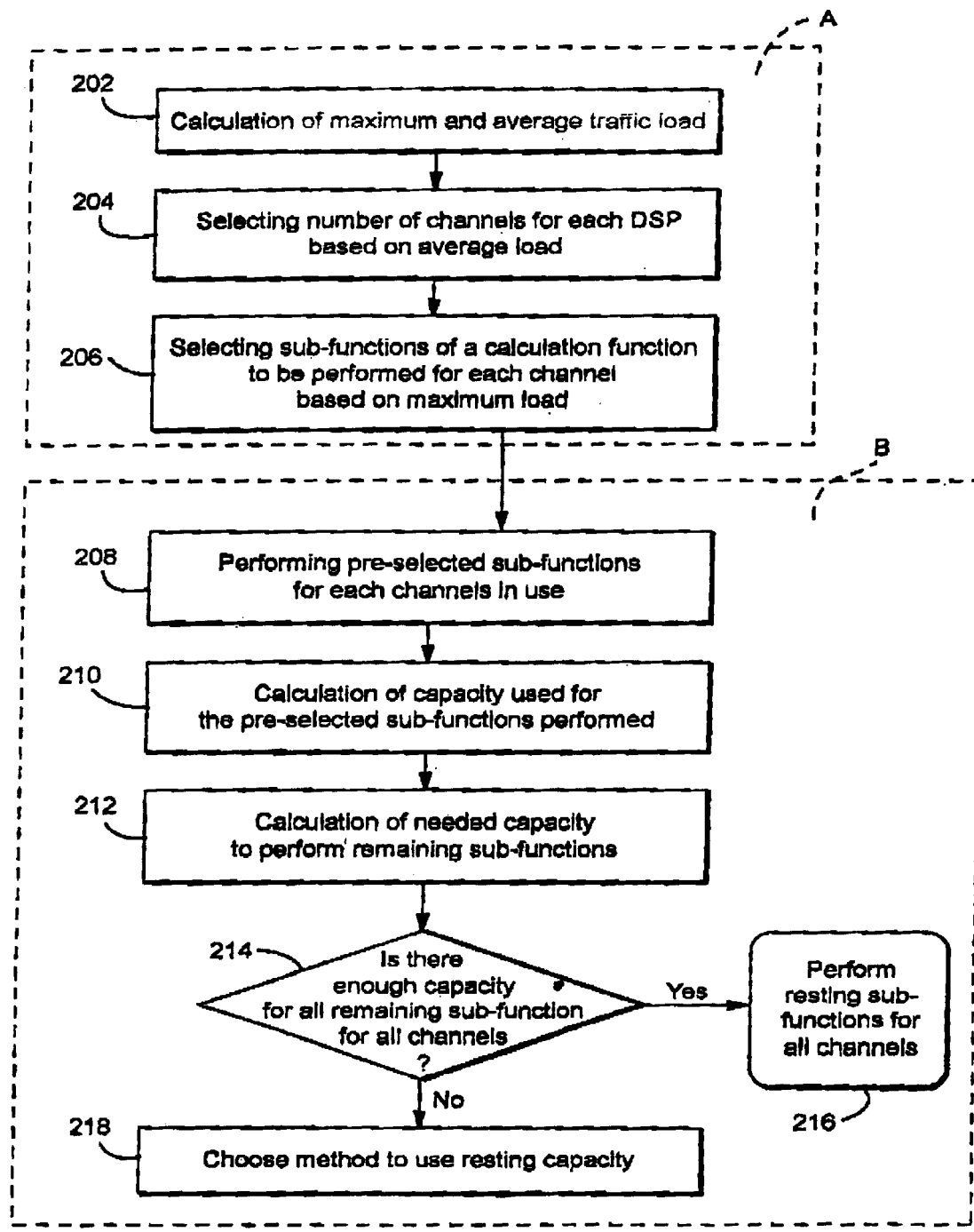
FIG. 2 is a flowchart illustrating steps performed in a method for reducing calculations made in an echo canceller.

Generally, the control or managing program 13 of the DSP 9 can be modified to include steps which will now be described with reference to the flowchart of FIG. 2. It is generally assumed that these steps are executed in a processor, e.g. a digital signal processor, DSP, that is used in a communication network and can handle a designed or predetermined maximum amount of communication channels. The processor is used for performing calculations generally on media streams by different procedures or algorithms, such as an echo cancellation algorithm, a transcoder algorithm etc.

The first ones of the added program steps included in a first block A are only executed in the setup of the managing program 13. They comprise in a first step 202 that the maximum load situation that might occur in the communication network used as well as the average load is calculated. The amount of communication channels to be handled in the communication network can be selected based on the average load or the like in a second step 204. One or more of the procedures or algorithms, also called sub-functions, is/are now selected to be performed for each channel in every situation, i.e. in a maximum load situation, in a third step 206. The sub-functions are selected so that the capacity of the communication system never exceeds the capacity needed in maximum load situations for each channel.

The remaining steps 208, 210, 212, 214, 216 and 218 are performed continuously in a never ending program loop and are included in a second block B. They are thus generally performed at each instant and are for example performed for each successive processing time when a new packet is to be handled or a new group of packets or a new frame is to be handled.

In the first step 208 of the never-ending loop the subfunctions preselected in step 208 are performed for each channel in use. Then the capacity, e.g. as given by the number of instructions used or the time required for performing the preselected subfunctions in the preceding step 208 is calculated in the next step 210. Thereupon the capacity needed to perform the remaining sub-functions is calculated in a block 212. The remaining sub-functions can then be performed in accordance with the available capacity left after performing the preselected subfunctions.

Thus, in the next step 214 it is determined whether there is capacity left to perform all the remaining subfunctions. If this is determined to be true, all the remaining subfunctions are performed in a step 216. If it is determined that there is not enough capacity left for the remaining sub-functions, a step 218 is performed. In the step 218 a method is chosen for using the remaining capacity. In the case where the processor handles a plurality of channels, some channels can be selected for which all remaining subfunctions are performed. Another alternative could comprise a round robin scheme ensuring that all subfunctions will be performed for all channels sooner or later. Also some kind of a mixture of these two methods can be used. In a further alternative only the subfunctions which are most important to the quality of the transmission are performed.

Thus, for a processor having a predetermined calculating capacity and handling a multitude of channels, more channels can be used without loosing any media streams than in prior art solutions in which the number of channels was selected on the basis of the worst situation, which is that of the maximum load. The method described herein is advantageous in this respect even if fewer channels are used as long as the number of channels is not designed for the maximum load.

In the following an example given for illustrative purposes will be described for a typical situation. The processor in the communication network in this example is assumed to be a digital signal processor having an execution capacity of 10 000 instructions per time unit. The digital signal processor is assumed to perform an echo cancellation algorithm, which is in this example divided in four subfunctions:
1) Filtering, requiring 100 instructions;
2) Filter updating, requiring 0–200 instructions;
3) Double-talk detection, requiring 50 instructions; and
4) Non-linear processing, requiring 50 instructions.

The total number of instructions, i.e. 400, is the peak number when all tasks are performed. Given a predetermined time period, for example one second, the digital signal processor might perform the algorithm thousands of times per channel.

In this example, for one channel of echo cancellation, the peak number of instructions adds up to 400. If peak allocation should be applied, as in prior art solutions, each digital signal processor should be able to handle 10 000/400=25 channels.

If it is considered that sub-function 2—on the average— only runs during half of the processing time, the DSP usage is only 300/400=75%. This means that each DSP could, on average, run 10 000/300=33 channels. 33 channels are therefore run at every DSP in this example. Then the echo cancellation algorithm can be performed in the following way:
1. Subfunctions 1, 3, and 4 are performed for each channel 1–33. The number of channels can be maximum 33. A note or record of the need to perform subfunction 2 is made. It is not noted when, for example, double-talk situations are detected.
2. The total number of instructions used so far is calculated. The total number of instructions is calculated for the currently served number of channels, which then is a number in the range of 0 to 33. The total number of instructions is in the range of 150 to 200 for each channel.
3. The number of instructions needed to update the filtering coefficients, i.e. to perform the subfunction 2, for all channels that have been marked for an update is calculated, which is in the range of 0 to 200 for each channel.

4. If the remaining numbers of instructions are sufficient, the filtering in all channels that are marked for an update are updated.

5. If the remaining number of instructions are insufficient, the filtering in as many marked channels as possible are updated.

The channels for which an update of filtering coefficients is to be made might be selected according to some simple round robin scheme, or in more advanced way by taking into account different service classes. That is, a call from a subscriber having low cost subscription might be assigned a lower priority in favour of a high cost ditto.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of processing speech information in a communication network in which pieces of speech infonnation are transmitted in packets or slots or frames, the method comprising:

performing plural subfunctions, each of the subfunctions having different priority and differently influencing quality of the transmitted information with different degrees of severity or importance;

for a given instant and for a piece of information, calculating a measure of total processing required;

comparing the measure of total processing required to total processing capability for handling the transmitted information at the given instant;

when the total processing required exceeds the total processing capability, performing a subset of the plural subfunctions on a priority basis.

2. A method according to claim 1, further comprising performing, as the subset, certain subfunctions which influence the transmitted information with a low degree of severity or a high degree of importance.

3. A method according to claim 2, further comprising for the given instant calculating the processing required by the subset of subfunctions;

determining processing capability remaining after performing the subset; and performing subfunctions different from the subset according to the calculated remaining processing capability.

4. A method according to claim 1, further comprising:

sending the information in the network in a plurality of parallel channels having different priority levels;

processing the information in each channel;

at the given instant calculating the measure of the total processing required for all of the parallel channels;

comparing the total processing required for all of the parallel channels to the total processing capability; and when the required processing required exceeds the total processing capability, performing more subfunctions for channels having a high priority level than for channels having a low priority level.

5. A method according to claim 1, wherein the plural subfunctions comprise an echo cancellation algorithm.

6. A method according to claim 5, wherein the echo cancellation algorithm function is divided into at least one of the following subfunctions: filtering, filter updating, double-talk detection, non-linear processing, noise estimation, and network probing.

7. A method according to claim 6, wherein the subfunctions of filtering, non-linear processing, filter updating, double talk detection, noise estimation, and network probing, taken in this sequential order, are assigned degrees of severity or importance in decreasing and increasing scales, respectively.

8. A method according to claim 4, further comprising, for the given instant, always performing preselected ones of the subfunctions for each channel, the preselected ones of the subfunctions being selected to require processing not exceeding the total processing capability.

9. A method according to claim 8, further comprising performing, for the given instant, remaining subfunctions not included in the preselected subfunctions in accordance with total processing left after performing the preselected ones of the subfunctions.

10. A method according to claim 1, further comprising determining the processing required by each of the subfunctions as a number of processor instructions used by the subfunction.

11. A method according to claim 4, further comprising basing a number of parallel channels in which information is sent in the communication network on an average of the processing required.

12. A method of processing speech information in a communication network in which pieces of speech information are transmitted in pieces in packets or slota or frames, the information in the network being Sent in a Plurality of parallel channels having different priority levels, the method comprising:

making calculations according to an algorithm, the algorithm comprising plural subfunctions, for a given instant and for a piece of information, calculating a measure of total processing required for all of the channels;

comparing the measure of total processing required for all of the channels to total processing capability for handling the transmitted information at the given instant;

when the total processing required exceeds the total processing capability, performing more of the subfunctions for channels having a high priority level than for channels having a low priority level.

13. A method according to claim 12, wherein each of the subfunctions influence the quality of the transmitted information with different degrees of severity or importance, and when the total processing required exceeds the total processing capability, performing, for channels having a low priority level, only those of the subfunctions which influence the transmitted information with a low degree of severity or a high degree of importance.

14. A method according to claim 12, Wherein the plural subfunctions comprise an echo cancellation algorithm.

15. A method according to claim 14, wherein the echo cancellation algorithm function is divided into at least one of the following subfunctions: filtering, filter updating, double-talk detection, non-linear processing, noise estimation, and network probing.

16. A method according to claim 15, wherein the subfunctions of filtering, non-linear processing, filter updating, double talk detection, noise estimation, and network probing, taken in this sequential order, are assigned degrees of severity or importance in decreasing and increasing scales, respectively.

17. A method according to claim 12, further comprising, for the given instant, always performing preselected ones of the subfunctions for each channel, the preselected ones of the subfunctions being selected to require processing not exceeding the total processing capability.

18. A method according to claim 17, further comprising performing for the given instant, remaining subfunctions not included in the preselected subfunctions in accordance with total processing left after performing the preselected ones of the subfunctions.

19. A method according to claim 12, further comprising determining the processing required by each of the subfunctions as a number of processor instructions used by the subfunction.

20. A method according to claim 12, further comprising basing a number of parallel channels in which information is sent in the communication network on an average of the processing required.

21. A method of processing speech information in a communication network in which pieces of speech information are transmitted in pieces in packets or slots or frames, the information in the network being sent in a plurality of parallel channels having different priority levels, the method comprising:

making calculations according to an algorithm, the algorithm comprising plural subfunctions;

for a given instant and for a piece of information, calculating a measure of total processing required for all of the channels;

comparing measure of total processing required for all of the channels to the total processing capability for handling the transmitted information at the given instant;

when the total processing required exceeds the total processing capability, performing some of the subfunctions for the channels in accordance with a round robin scheme.

22. A method according to claim 21, wherein the plural subfunctions comprise an echo cancellation algorithm.

23. A method according to claim 22, wherein the echo cancellation algorithm function is divided into at least one of the following subfunctions: filtering, filter updating, double-talk detection, non-linear processing, noise estimation, and network probing.

24. A method according to claim 23, wherein the subfunctions of filtering, non-linear processing, filter updating, double talk detection, noise estimation, and network probing, taken in this sequential order, are assigned degrees of severity or importance in decreasing and increasing scales, respectively.

25. A method according to claim 21, further comprising, for the given instant, always performing preselected ones of the subfunctions for each channel, the preselected ones of the subfunctions being selected to require processing not exceeding the total processing capability.

26. A method according to claim 25, further comprising performing, for the given instant, remaining subfunctions not included in the preselected subfunctions in accordance with total processing left after performing the preselected ones of the subfunctions.

27. A method according to claim 21, further comprising determining the processing required by each of the subfunctions as a number of processor instructions used by the subfunction.

28. A method according to claim 27, further comprising basing a number of parallel channels in which information is sent in the communication network on an average of the processing required.

29. A processor for processing speech information sent as pieces of transmitted information in packets or slots or frames, the processor comprising:

calculating means for making calculations according to an algorithm comprising plural subfunctions, the calculation means comprising calculation modules, each calculation module adapted to perform art individual one of the subfunctions, each of the subfunctions having different priority and differently influencing quality of the transmitted information;

control means for determining, at a given instant and for a piece of information, a measure of total processing by the processor required and for comparing the measure to the total processing capability of the processor for handling the transmitted information, and for selecting, in the case where the total processing required exceeds the total processing capability, calculation modules which perform subfunctions that influence the transmitted information with a low degree of severity or a high degree of importance, the calculation modules not selected being inactive at the given instant and thereby not performing their subfunctions.

30. A processor according to claim 29, wherein the control means are arranged to select for the given instant only calculation modules performing preselected ones of the subfunctions, the preselected ones influencing the transmitted information with a low degree of severity or a high degree of importance.

31. A processor according to claim 30, wherein the control means are arranged to calculate for the given instant the processing required by the preselected subfunctions and to determine the processing capability of the processor remaining after performing the preselected subfunctions and to activate calculation modules performing subfunctions differing from the preselected subfunctions, the activation being made according to the calculated remaining processing capability.

32. A processor according to claim 29, wherein when the information in the network is sent in a plurality of parallel channels having different priority levels, wherein the processor is arranged to process the information in each of the channels and to calculate for the given instant the measure of the total processing required for all of the parallel channels and comparing the measure, and when the measure of the required processing required is found to exceed the total processing capability, to activate more calculating modules performing subfunctions for information sent in channels having a high priority level than for information sent in channels having a low priority level.

33. A processor accordion to claim 29, wherein the calculation means arranged to perform an echo cancellation algorithm.

34. A processor according to claim 33, wherein the calculating modules are arranged to perform subfunctions of the echo cancellation algorithm function including at least one of: filtering, filter updating, double-talk detection, non-linear processing, noise estimation, and network probing.

35. A processor according to claim 34, wherein the subfunctions of filtering, non-linear processing, filter updating, double talk detection, noise estimation, and network probing, taken in this sequential order, are assigned degrees of severity or importance in decreasing and increasing scales respectively.

36. A processor according to claim 32, wherein the control means are arranged to activate for the given instant calculating modules performing preselected ones of the subfunctions for all of the channels, the preselected ones of the sub-functions being selected to require processing not exceeding the total processing capability.

37. A processor according to claim 36, wherein the control means are arranged to activate for the given instant the calculating modules performing the remaining subfunctions not included in the preselected ones in accordance with the total processing left after performing the preselected ones of the subfunctions.

38. A processor according to claim 29, wherein the control means are arranged to determine the processing required by the calculating modules for performing each of the subfunctions as the number of processor instructions used by the subfunction.

39. A processor according to claim 32, wherein the processor is arranged to handle a number of parallel channels in which information is sent in the communication network, the number being based on an average of the processing required for performing the algorithm.

40. A processor for processing speech information sent as pieces of transmitted information in packets or slots or frames in a communication network, the information in the network being sent in a plurality of parallel channels having different priority levels, the processor comprising:

calculating means for making calculations according to an algorithm comprising plural subfunctions of differing priority and differing subfunctionality, the calculation means comprising calculation modules, each calculation module adapted to perform an individual one of the subfunctions;

control means for determining, for a given instant and for a piece of information, a measure of total processing by the processor required for all of the channels at the given instant and for comparing the measure to total processing capability of the processor for handling the transmitted information, and for activating, when the total processing required exceeds the total processing capability, more calculating modules performing subfunctions for information sent in channels having a high priority level than for information sent in channels having a low priority level.

41. A processor according to claim 40, wherein the calculating modules are arranged to perform subfunctions which influence quality of the information sent with differing degrees of severity or importance, and that the control means are arranged to activate, when the total processing required exceeds the total processing capability, for channels having a low priority level, only those of the calculating modules which perform subfunctions that influence the information sent with a low degree of severity or a high degree of importance.

42. A processor according to claim 40, wherein the calculation means are arranged to perform an echo cancellation algorithm.

43. A processor according to claim 42, wherein the calculating modules are arranged to perfonn subfunctions of the echo cancellation algorithm function including at leant one of: filtering, filter updating, double-talk detection, non-linear processing, noise estimation, and network probing.

44. A processor according to claim 43, wherein the subfunctions of filtering, non-linear processing, filter updating, double talk detection, noise estimation, and network probing, taken in this sequential order, are assigned degrees of severity or importance in decreasing and increasing scale, respectively.

45. A processor according to claim 40, wherein the control means are arranged to activate for the given instant calculating modules performing preselected ones of the subfunctious for all of the channels the preselected ones of the sub-functions being selected to require processing not exceeding the total processing capability.

46. A processor according to claim 45, wherein the control means are arranged to activate for the given instant the calculating modules performing the remaining subfunctions not included in the preselected ones in accordance with the total processing left after performing the preselected ones of the subfunctions.

47. A processor according to claim 40, wherein the control means are arranged to determine the processing required by the calculating modules for performing each of the subfunctions as the number of processor instructions used by the subfunction.

48. A processor according to claim 40, wherein the processor is arranged to handle a number of parallel channels in which information is sent in the communication network, the number being based on an average of the processing required for performing the algorithm.

49. A processor for processing speech information sent as pieces of speech information in packets or slots or frames in a communication network, the information in the network being sent in a plurality of parallel channels having different priority levels, the processor comprising:

calculating means for making calculation, according to an algorithm comprising plural subfunctions of differing priority and differing subfunctionality, the calculation means comprising calculation modules, each calculation module adapted to perform an individual one of the subfunctions;

control means for determining, at a given instant and for a piece of information, a measure of total processing by the processor required for all of the clannels at the given instant and for comparing the measure to total processing capability of the processor for handling the transmitted information, and for activating, when the total processing required is found to exceed the total processing capability some of the calculating modules performing subfunctions for the channels in accordance with a round robin scheme for the channels.

50. A processor according co claim 49, wherein the calculation means are arranged to perform an echo cancellation algorithm.

51. A processor according to claim 50, wherein the calculating modules are arranged to perform subfunctions of the echo cancellation algorithm function including at least one of: filtering, filter updating, double-talk detection, non-linear processing, noise estimation and network probing.

52. A processor according to claim 51, wherein the subfunctions of filtering non-linear processing, filter updating, double talk detection, noise estimation, and network probing, taken in this sequential order, are assigned degrees of severity or importance in decreasing and increasing scales, respectively.

53. A processor according to claim 49, wherein the control means are arranged to activate for the given instant calculating modules performing preselected ones of the subfunctions for all of the channels, the preselected ones of the sub-functions being selected to require processing not exceeding the total processing capability.

54. A processor according to claim 53, wherein the control means are arranged to activate for the given instant the calculating modules performing the remaining subfunctions not included in the preselected ones in accordance with the total processing left after performing the preselected ones of the sub functions.

55. A processor according to claims 49, wherein the control means are arranged to determine the processing required by the calculating modules for performing each of the subfunctions as the number of processor instructions used by the subfunction.

56. A processor according to claim 49, whereim the processor is arranged to handle a number of parallel channels in which information is sent in the communication network, the number being based on an average of the processing required for performing the algorithm.

57. An echo canceller which receives pieces of speech information transmitted as packets or slots or frames, the echo canceller comprising a processor which is configured to make a determination whether an amount of processing required at a given instant for performing echo cancellation exceeds a total processing capability of the processor for handling echo cancellation and, in dependence on the determination, to execute a subset of plural potential echo cancellation subfunctions, with each of the subfunctions having differing subfunctionality and differently influencing the echo cancellation.

58. The echo canceller of claim 57, wherein the plural potential echo cancellation subfunctions include at least one of: filtering, filter updating, double-talk detection, non-linear processing, noise estimation and network probing.

59. The echo canceller of claim 58, wherein the plural potential echo cancellation subfunctions are prioritized in the following order: filtering, non-linear processing, filter updating, double talk detection, noise estimation, and network probing.

60. An executable program stored in a memory which, when executed by a processor, performs steps of:
   making a determination whether an amount of processing required at a given instant for performing speech signal processing exceeds a total processing capability of the processor for handling the speech signal processing;
   in accordance with the determination, invoking a subset of potential plural speech signal processing subfunctions, with each of the subfunctions having differing subfunctionality and differently influencing the speech signal processing, thereby determining a number of speech signal processing subfunctions to be allocated to a speech signal processing task in accordance with load on the processor.

61. The executable program of claim 60, wherein the speech signal processing is echo cancellation or transcoding.

* * * * *